(12) United States Patent
Swan et al.

(10) Patent No.: US 9,981,749 B1
(45) Date of Patent: May 29, 2018

(54) PARACHUTE DEPLOYMENT SYSTEM USING DECOUPLED TOW AND RELEASE LINES

(71) Applicant: Kitty Hawk Corporation, Mountain View, CA (US)

(72) Inventors: Peter A. Swan, West Sacramento, CA (US); Craig Western, San Francisco, CA (US); Damon Vander Lind, East Palo Alto, CA (US); Amy Qian, Sunnyvale, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days. days.

(21) Appl. No.: 15/783,909

(22) Filed: Oct. 13, 2017

(51) Int. Cl.
*B64D 17/72* (2006.01)
*B64D 17/80* (2006.01)

(52) U.S. Cl.
CPC ........... *B64D 17/725* (2013.01); *B64D 17/80* (2013.01)

(58) Field of Classification Search
CPC ...... B64D 17/725; B64D 17/80; B64D 17/72; B64D 17/62
See application file for complete search history.

(56) References Cited

U.S. PATENT DOCUMENTS

| | | | | |
|---|---|---|---|---|
| 3,913,873 A | * | 10/1975 | Nimylowycz | B64D 17/72 244/149 |
| 4,004,764 A | * | 1/1977 | Burklund | B64D 17/725 244/141 |
| 6,487,951 B1 | | 12/2002 | Petkantchin | |
| 2015/0314881 A1 | | 11/2015 | Tsaliah et al. | |
| 2016/0251083 A1 | | 9/2016 | Tsaliah et al. | |
| 2017/0233086 A1 | * | 8/2017 | Homan | B64D 17/72 244/139 |

FOREIGN PATENT DOCUMENTS

DE            3329490 A1 *  3/1985  ............. B64D 17/62

OTHER PUBLICATIONS

Author Unknown, BRS-182 System Description, Dec. 2, 2004, Ballistic Recovery Systems, Inc.
Author Unknown, Galaxy GRS Ballistic Parachute Rescue System Instruction Manual for Assembly and Use, Mar. 21, 2016.
Author Unknown, Magnum Ballistic Rescue Parachute Systems Series Magnum Installation and User's Manual, 2014.

* cited by examiner

*Primary Examiner* — Brian M O'Hara
(74) *Attorney, Agent, or Firm* — Van Pelt, Yi & James LLP

(57) ABSTRACT

A parachute system includes a parachute which is coupled to a rocket via a first load path, which includes a tow line, one or more upper parachute lines, and one or more lower parachute lines, and a second load path, which includes a release line. The rocket is configured to tow the parachute via the tow line. There is a lower parachute line restrainer which when released permits the lower parachute lines to extend to full length. There is also a release which is configured to open in the event a load switches from the first load path to the second load path; when the release is open, the parachute and the rocket are permitted to separate.

11 Claims, 12 Drawing Sheets

PARACHUTE DEPLOYMENT SYSTEM USING DECOUPLED TOW AND RELEASE LINES

BACKGROUND OF THE INVENTION

Aircraft or payload recovery may be required at low altitude, low speed conditions. For example, an aircraft may be hovering or transitioning between stages of flight and this transition (e.g., depending on flight conditions) can occur immediately after takeoff (e.g., on the order of a few meters). Low altitude conditions necessitate a parachute that opens with minimal altitude loss. Low speed conditions may present a lack of a strong airstream that can quickly inflate a parachute. In order to avoid high velocity impact and ensure occupant or payload safety, a parachute deployment system is required that quickly extracts a parachute at low altitude, low speed conditions.

In some embodiments, a self-propelled projectile such as a rocket is used to quickly extract the parachute from the aircraft or other payload. The self-propelled projectile may present hazards or undesired weight if left attached to the parachute following parachute extraction. The extra line length may also constrict or interfere with the canopy as it inflates. Releasing the self-propelled projectile at full extension under high line loads may result in parachute recoil, unpredictable parachute deployment, and/or altitude loss. New parachute systems which work with a self-propelled projectile but mitigate recoil when the projectile and aircraft disconnect would be desirable.

BRIEF DESCRIPTION OF THE DRAWINGS

Various embodiments of the invention are disclosed in the following detailed description and the accompanying drawings.

DETAILED DESCRIPTION

Figure 1:
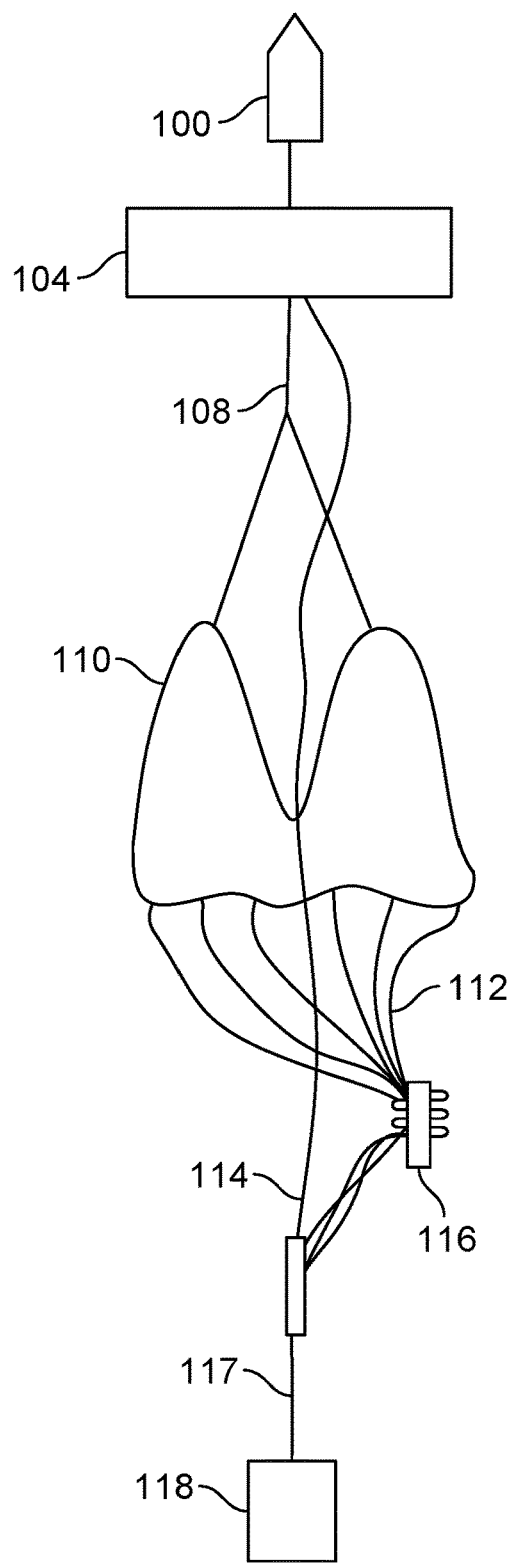
FIG. 1 is a diagram illustrating an embodiment of a parachute deployment system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a parachute deployment system are disclosed herein. In some embodiments, the system includes a parachute which is coupled to a rocket via a first load path (which includes a tow line, one or more upper parachute lines, and one or more lower parachute lines) and a second load path (which includes a release line). The upper parachute lines are sometimes referred to as crown lines and the lower parachute lines are sometimes referred to as suspension lines. The system also includes the rocket which is configured to tow the parachute via the tow line, a lower parachute line restrainer (which when released permits the lower parachute lines to extend to full length), and a release where the release is configured to open in the event a load switches from the first load path to the second load path and when the release is open, the parachute and the rocket are permitted to separate.

Quickly extracting the parachute using a rocket exerts a high load on at least one line (e.g., the rocket tow line and also the upper parachute lines or crown lines) connecting the rocket and the parachute. The rocket is released or otherwise disconnected from the parachute following parachute extraction for various reasons. For example, if the rocket remains attached, it may present a fire hazard to the parachute, add undesirable weight to the parachute and payload, and/or cause the parachute to move in an undesirable and/or unpredictable manner. The additional line length may constrict the fabric of the canopy and may prevent the parachute from opening freely. The manner in which the rocket is released or otherwise disconnected from the parachute must be carefully considered. For example, severing (e.g., directly cutting) the line that connects the rocket and the parachute while the line is under high load (e.g., because the rocket is pulling the line taut) causes the line and/or parachute to recoil. Recoil of the parachute may result in unpredictable inflation, line tangling, and/or altitude loss, and is therefore undesirable.

The disclosed system comprises a tow line and a (e.g., separate) release line. In some embodiments, both lines are attached to a release which connects the rocket and the parachute and (e.g., at the appropriate time or condition) disconnects the rocket and the parachute from each other. In some embodiments, having a separate tow line and release line allows the parachute to be extracted quickly (e.g., using the tow line where the tow line is taut and the release line is slack) and the rocket to be released smoothly (e.g., when the release line becomes taut). In the disclosed system, the tow line first takes the load of the payload. That is to say, the tow line is part of a load path that connects the rocket to the payload. The load path may comprise the tow line, upper lines of the parachute or crown lines, suspension lines of the parachute, and a riser of the parachute. In some embodiments, various parts of the parachute (e.g., the lines, the riser, etc.) are constructed of nylon because nylon is better for shock absorption. In some embodiments, the release line is situated (e.g., runs) parallel to the tow line but is slack and bears no load (at least initially). A lower parachute line restrainer (at least in some embodiments) is configured to release under a threshold force and may release after a canopy of the parachute is fully extracted. In some embodiments, release of the lower parachute line restrainer causes the load to shift from the tow line to the release line. For example, the release line begins to be pulled taut. In some embodiments, the load is shifted by changing relative lengths of the lines. Due to the load on the release line, the release opens. In some embodiments, the release opens under a small load. The opening of the release causes the rocket and the parachute to detach.

FIG. 1 is a diagram illustrating an embodiment of a parachute deployment system. In the example shown, rocket 100 is tethered to release 104. In some embodiments, rocket 100 is permanently attached or connected to release 104. For example, release 104 is designed to remain with rocket 100 following separation of rocket 100 and canopy 110. In various embodiments, release 104 comprises a latch, a cutter, a pin, or any other appropriate release. As will be described in more detail below, the release is designed to disconnect the rocket from the rest of the aircraft (including the parachute) with minimal recoil.

Tow line 108 is attached to release 104 at its upper end. At its lower end, tow line 108 is attached to canopy 110 via two lines that split from the tow line. The two lines shown are attached to the canopy in the middle of the canopy, between an apex and outer edge of the canopy. In some embodiments, attaching the tow line to the middle of the canopy or lower on the canopy than its apex allows lower sections of the canopy to be pulled out quickly, which helps when the aircraft is at a low altitude, and provides even distribution of tension across all lower parachute lines. In various embodiments, tow line 108 is attached to canopy 110 using 4, 10, 20, or any appropriate number of lines. The tow line may split into multiple lines that are positioned equidistant around the canopy. In some embodiments, the canopy is packed and initially extracted in an "M" cross-sectional shape which inflates more quickly than a typical cylindrical shape. For example, the apex of the canopy is packed in an inverted position.

Suspension lines 112 extend from canopy 110. In various embodiments, various numbers of suspension lines are used. A portion of the suspension lines is folded up and held in lower parachute line restrainer 116. In various embodiments, lower parachute line restrainer 116 comprises a bight, a tied or sewed cloth, a thin plastic tube, a cardboard loop, or any appropriate restrainer that holds the suspension lines such that their lengths are effectively shortened. The lower parachute line restrainer is configured to release under a threshold force (e.g., due to the rocket). For example, the lower parachute line restrainer is configured to break, rip, tear, or open under the threshold force. The suspension lines 112 and release line 114 are attached at their bottom ends to riser 117. In various embodiments, riser 117 comprises one line, multiple lines, or webbing. Riser 117 is attached to payload 118. In some embodiments, payload 118 comprises an aircraft. In some embodiments, the release line is tied to the apex, which in turn is tied to the center line.

The following figures show examples of the exemplary parachute deployment system at various points in time in order to better illustrate how the parachute deployment system works and how it is able to disconnect the rocket with little or no recoil.

Figure 2A:
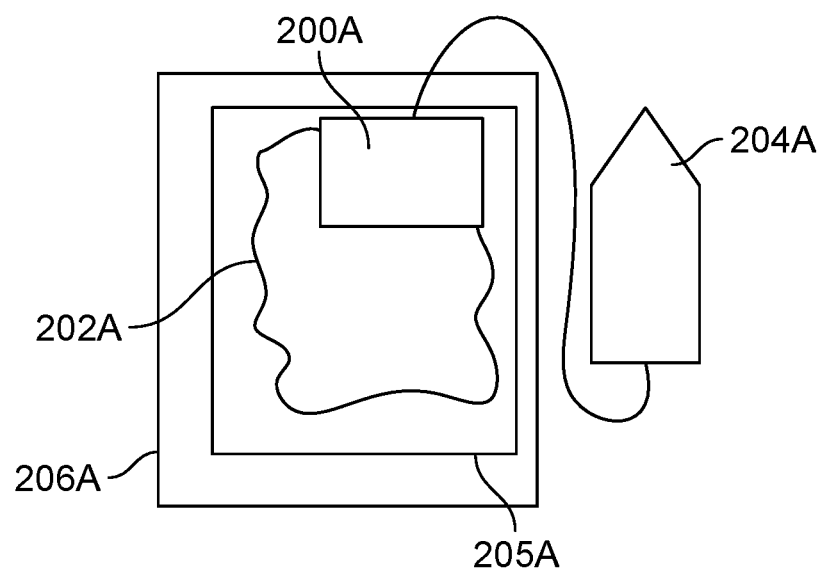
FIG. 2A is a diagram illustrating an embodiment of a parachute deployment system in a stowed state.

FIG. 2A is a diagram illustrating an embodiment of a parachute deployment system in a stowed state. In the example shown, a parachute is stowed inside can 205A. Canopy 202A is folded and stored in the can along with release 200A. The can is stored on or in payload 206A, which may comprise a cavity or compartment in an aircraft where the parachute deployment system is stored. Rocket 204A is positioned externally to the can.

Figure 2B:
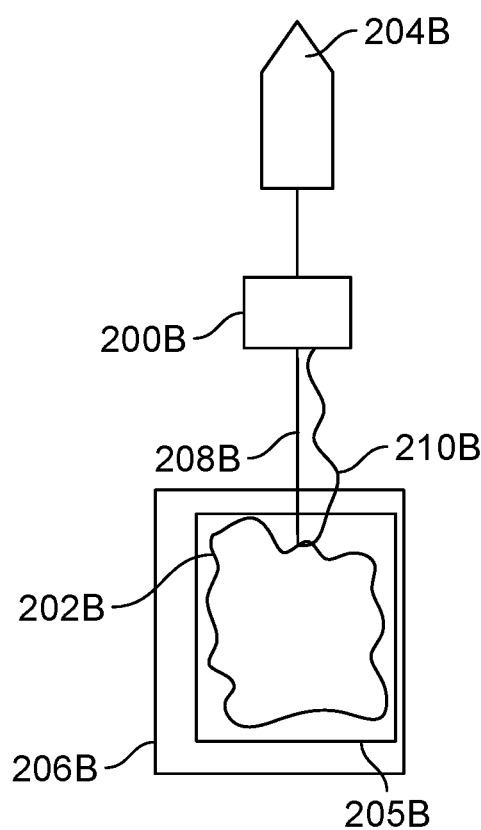
FIG. 2B is a diagram illustrating an embodiment of a parachute deployment system following rocket deployment.

FIG. 2B is a diagram illustrating an embodiment of a parachute deployment system following rocket deployment. Upon triggering the parachute deployment system, rocket 204B begins traveling upwards away from payload 206B. The rocket is attached to and tows release 200B. Release 200B in turn is attached to the parachute via tow line 208B and release line 210B. Canopy 202B remains folded inside of can 205B. It is noted that in the state shown here, the tow line 208B is taut and the release line 210B is slack.

Figure 2D:
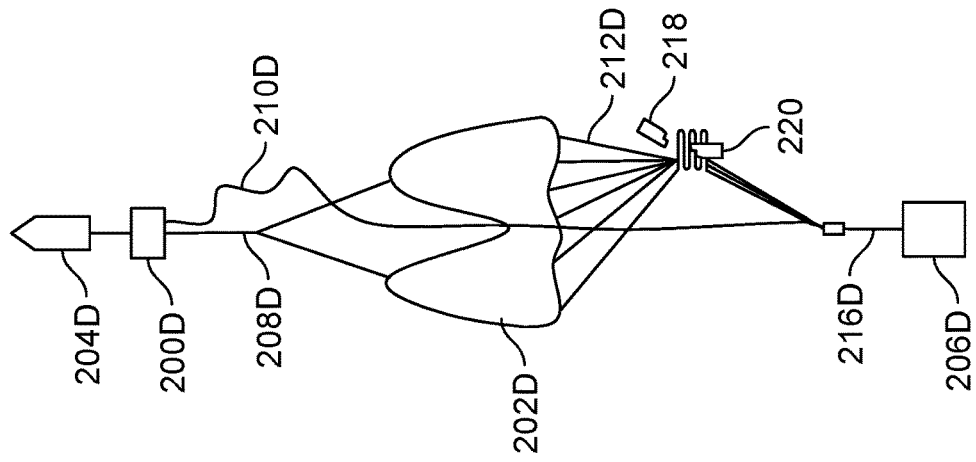
FIG. 2D is a diagram illustrating an embodiment of a parachute deployment system during release of a lower parachute line, canopy line, and/or suspension line restrainer.
Figure 2C:
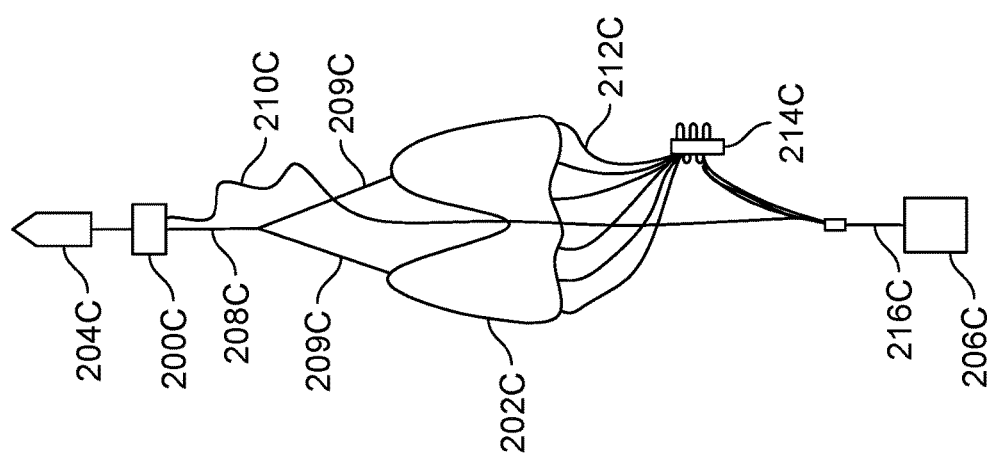
FIG. 2C is a diagram illustrating an embodiment of a parachute deployment system wherein the parachute is towed via a tow line.

FIG. 2C is a diagram illustrating an embodiment of a parachute deployment system wherein the parachute is towed via a tow line. In the example shown, canopy 202C has been extracted and is no longer in the can (not shown). Rocket 204C tows release 200C. Release 200C is attached to canopy 202C via tow line 208C and upper parachute lines (209C) which are sometimes referred to as crown lines. Suspension lines 212C extend from canopy 202C and a portion of the lines is held in lower parachute line restrainer 214C, shortening the effective lengths of the lines. Release line 210C extends from release 200C. Suspension lines 212C and release line 210C are attached to riser 216C.

As shown, rocket 204C is towing canopy 202C upwards via tow line 208C and therefore tow line 208C is taut. Release line 210C is slack in the state shown. In some embodiments, the length of release line 210C is longer than the combined length of the tow line, canopy length between the tow line and suspension lines, and suspension lines held in lower parachute line restrainer 214C. In this initial extraction state, neither the tow line nor the release line are under load. As the rocket travels further from the payload, the combined length of tow line 208C, suspension lines 212C, and riser 216C are pulled taut. Once that occurs, the portion of the canopy between the tow line and suspension lines is also pulled taut. At this point, the parachute is fully extracted from the can. The rocket pulls upwards on the combined length while the payload exerts a downwards force on the combined length due to inertia. The tow line is under load, whereas the release line remains slack and is not under load. The load path from the rocket to the payload travels through the tow line, suspension lines held in the restrainer, and riser rather than traveling through the release line and riser because the release line is longer in length than the combined length of the tow line, suspension lines held in the restrainer, and intermediaries such as the portion of the canopy between the tow line and suspension lines or lines used to attach the tow line to the canopy.

FIG. 2D is a diagram illustrating an embodiment of a parachute deployment system during release of a lower parachute line, canopy line, and/or suspension line restrainer. For simplicity, a lower parachute line restrainer is described in this example, but in other embodiments a restrainer is associated with a canopy line and/or suspension line (e.g., in addition to or as an alternative to a lower parachute line). In this example, the lower parachute line restrainer is configured to release under a first threshold force. In some embodiments, the lower parachute line restrainer is configured to release after the parachute is fully extracted from the can. For example, the first threshold force is equal to a force the lower parachute restrainer experiences in the event the suspension lines are pulled taut. In some embodiments, the first threshold force is equal to a force that the lower parachute line restrainer experiences in the event of sustained load on the suspension lines. For example, the lower parachute line restrainer will not break immediately in the event the suspension lines are pulled taut, but a short time after due to the forces exerted by the rocket and payload. In some embodiments, the first threshold force is determined based on experimental data. The type of lower parachute line restrainer may be chosen based on the first threshold force. The lower parachute line restrainer may be calibrated based on the first threshold force. For clarity, suspension lines 212D and lower parachute line restrainer pieces 218 and 220 are shown pulled to the side so that they are not obscured by release line 210D. In actuality, the suspension lines 212D may be pulled straight (e.g., between the rocket and payload) when the lower parachute line restrainer breaks or otherwise releases.

In the example shown, lower parachute line restrainer pieces 218 and 220 have broken off of suspension lines 212D. The suspension lines as shown have been released from their shortened position and released from their taut, shortened position. Tow line 208D is taut. Release line 210D is slack. As rocket 204D continues traveling upwards away from payload 206D, both lines may first be slack because both are too long to restrain the rocket initially. As the rocket continues traveling or the payload continues falling, load will eventually transition to release line 210D due to its shorter length compared to the longer combined length of the tow line, canopy portion, and suspension lines (no longer shortened by the lower parachute line restrainer).

Figure 2F:
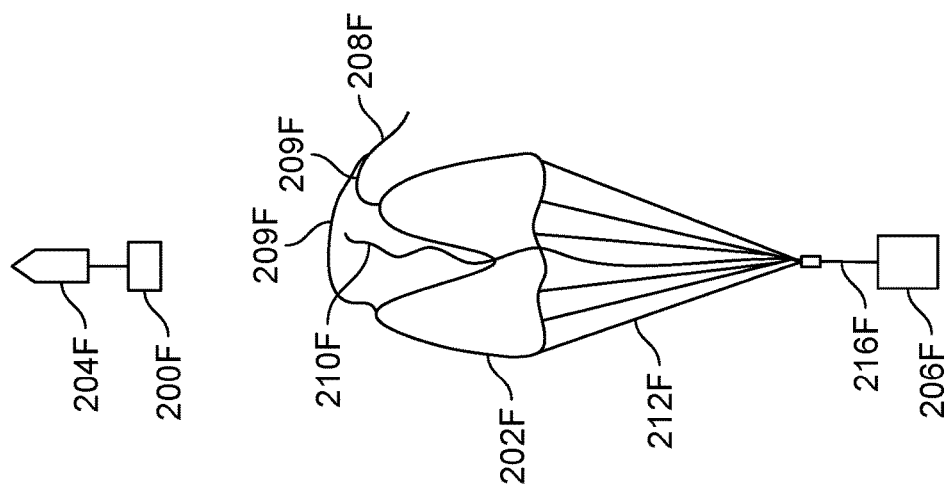
FIG. 2F is a diagram illustrating an embodiment of a parachute deployment system wherein the parachute is separated from a rocket.
Figure 2E:
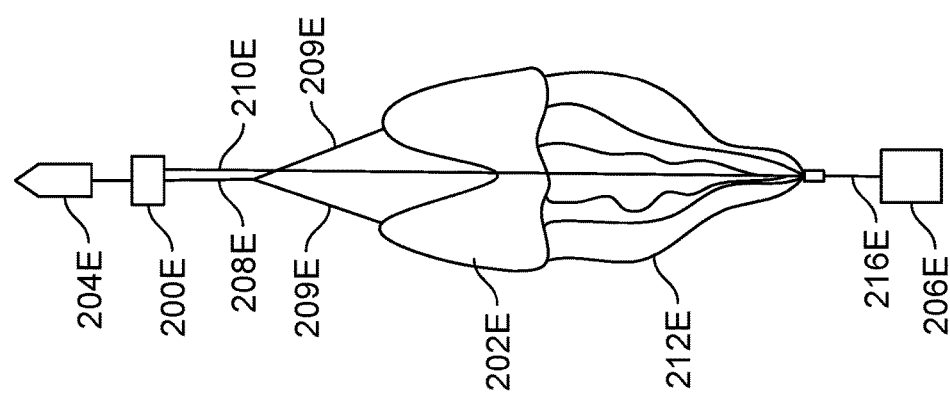
FIG. 2E is a diagram illustrating an embodiment of a parachute deployment system wherein the tow load imparted by the rocket is transferred to a release line.

FIG. 2E is a diagram illustrating an embodiment of a parachute deployment system wherein the tow load imparted by the rocket is transferred to a release line. It is noted that the parachute isn't actually towed at this point. In the example shown, suspension lines 212E are at their full, unrestrained length. The suspension lines 212E are slack because the load has shifted to release line 210E such that release line 210E is taut. The load path from rocket 204E to payload 206E now comprises release line 210E and riser 216E. In some embodiments, the release line is attached to the center line and then to the riser. The release line is shorter in length than the combined length of the length of tow line 208E, the upper parachute or crown lines (209E), the length of the portion of canopy 202E that is in between the tow line and the suspension lines, and the length of one suspension line.

The release line is configured to open release 200E under a second threshold force. Some examples of the release are described in more detail below. In some embodiments, the second threshold force is a low force. The second threshold force may be lower than the first threshold force required to release the lower parachute line restrainer. A desired level of force for the second threshold force may be determined experimentally. In the event the release line is under the second threshold force, release 200E opens. In some embodiments, the opening of release 200E allows the parachute and rocket to separate with little or no recoil.

FIG. 2F is a diagram illustrating an embodiment of a parachute deployment system wherein the parachute is separated from a rocket. In the example shown, rocket 204F remains tethered to release 200F. The rocket and release are separated from the parachute and payload. Release line 210F and tow line 208F and upper parachute lines 209F dangle from canopy 202F. In some embodiments, canopy 202F completely fills following detachment of the rocket.

In some embodiments, a parachute deployment system includes other components and/or is configured in some other manner not shown here. The following figure describes one such alternate.

Figure 3:
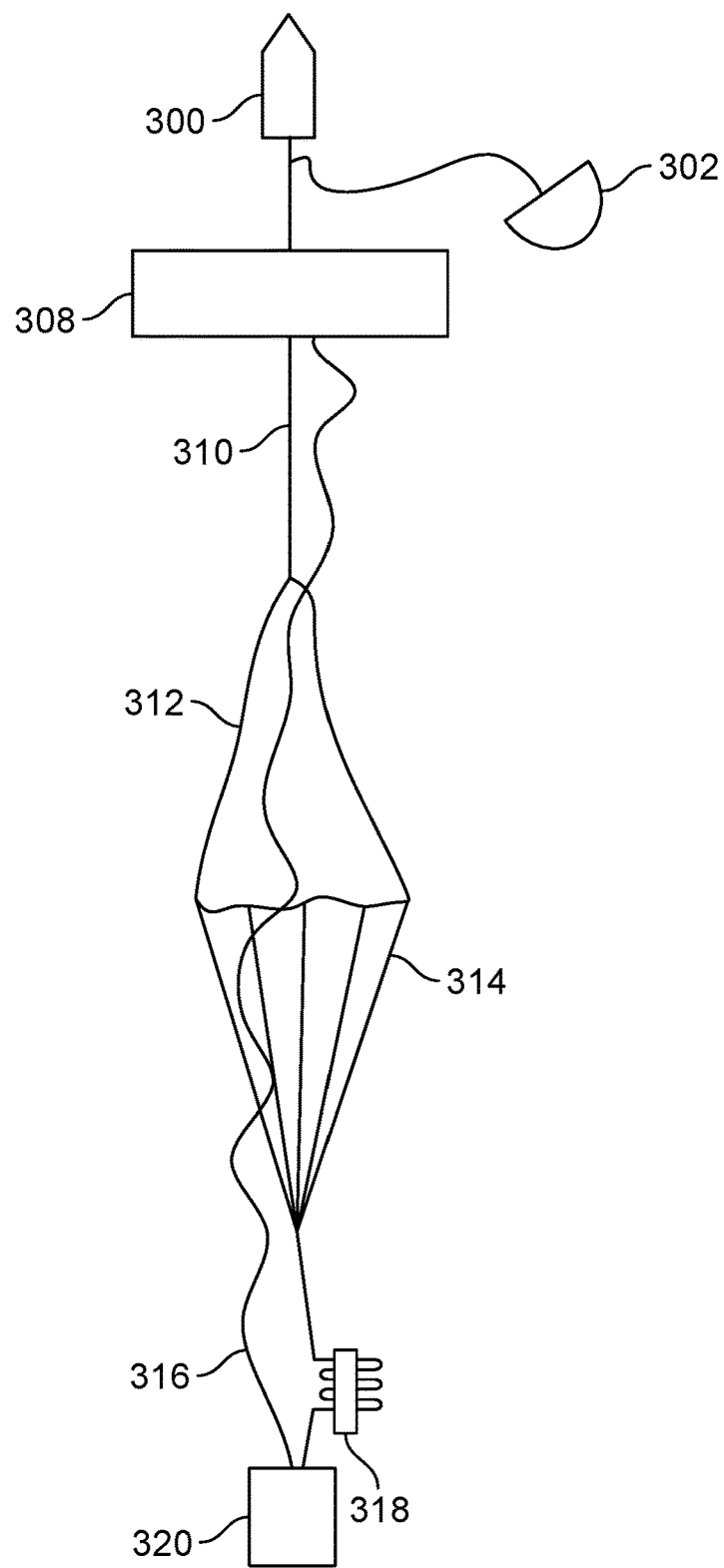
FIG. 3 is a diagram illustrating an embodiment of a parachute deployment system.

FIG. 3 is a diagram illustrating an embodiment of a parachute deployment system. In this example, the rocket 300 has an attached parachute 302 that allows the rocket to float to the ground. The parachute may be installed for safety to prevent the rocket from impacting a person or object at a high speed and causing damage.

In various embodiments, the parachute is towed from different points on its canopy and this figure shows an example different from that shown in the previous figures. In this example, tow line 310 is attached at the apex of canopy 312. Canopy 312 is extracted in a roughly triangular cross-section shape.

In various embodiments, the lower end of the release line is attached at different points. For example, the release line as shown is attached to the payload directly. In some embodiments, the release line is attached to a riser of the parachute.

In some embodiments, the lower parachute line restrainer restrains a riser of the parachute rather than suspension lines. In the example shown, lower parachute line restrainer 318 holds a riser of the parachute in a position such that its effective length is shortened. For example, loops of the riser are folded back and forth and secured. Release line 316 is longer than a combined length of the length of tow line 310, a length from apex to opening of canopy 312, a length of one suspension line of suspension lines 314, and the riser as restrained by lower parachute line restrainer 318. In the event lower parachute line restrainer 318 is released, the release line is shorter the prior described combined length.

In some embodiments, the relative lengths concept remains the same regardless of positioning of the release line, tow line, and lower parachute line restrainer. For example, a first load path which includes the tow line is initially longer than a second load path which includes the release line. Following release of the lower parachute line restrainer, the first load path is shorter than the second load path, which eventually causes the load patch to change.

In some embodiments, the parachute deployment system includes a rip stitch (not shown here). A rip stitch is a fabric piece that is designed to rip in order to absorb shock when the parachute deploys, reducing line loading and thus reducing recoil. In some embodiments, a rip stitch is placed at the very bottom of the riser and/or at the bottom of the suspension lines.

The following figure describes the examples above more generally and/or formally in a flowchart.

Figure 4:
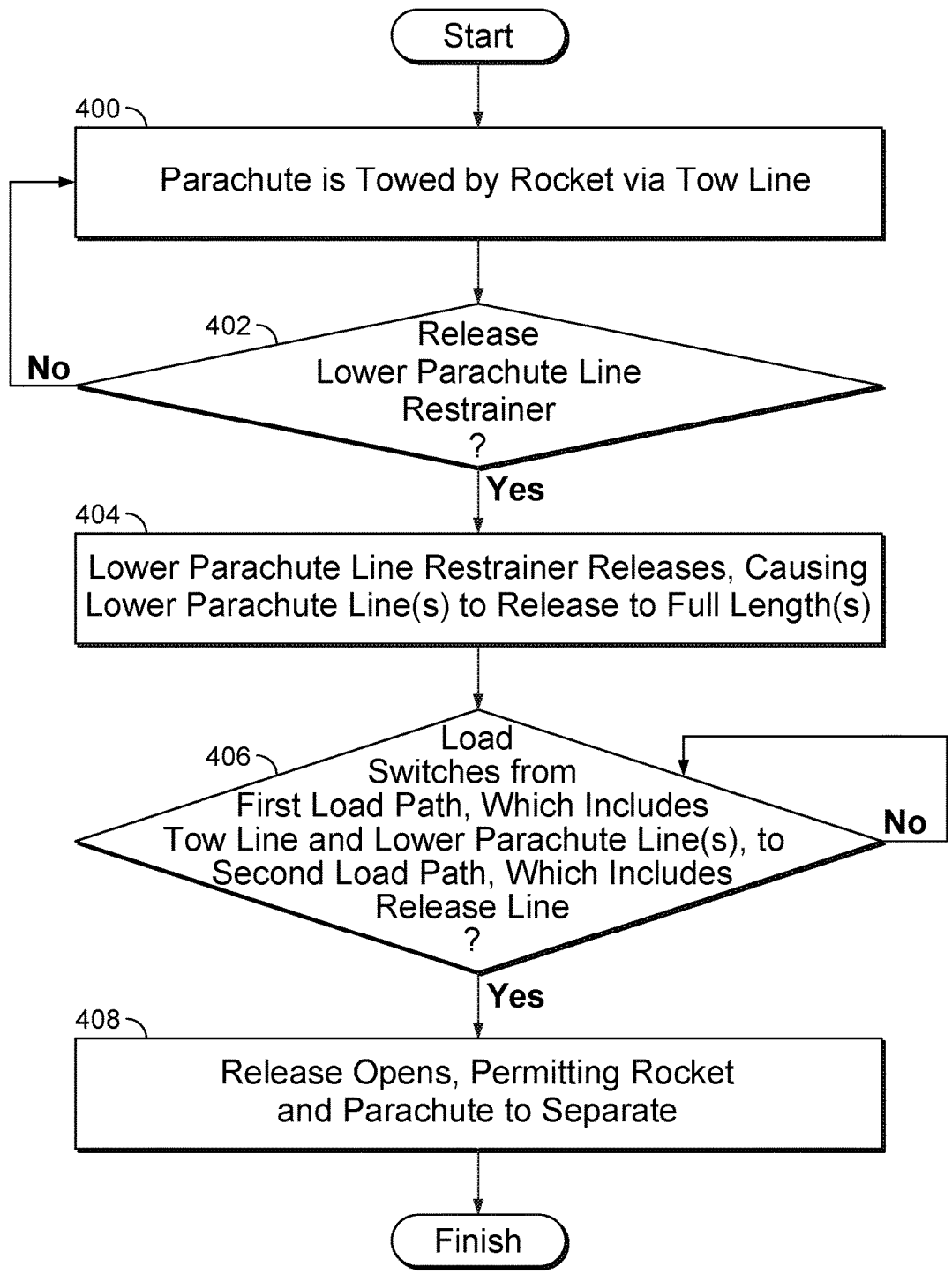
FIG. 4 is a flow diagram illustrating an embodiment of a parachute deployment system process.

FIG. 4 is a flow diagram illustrating an embodiment of a process to deploy a parachute, including release of a rocket. At 400, a parachute is towed by a rocket via a tow line. For example, the rocket begins traveling upwards and away from the payload. As the rocket travels upwards, a release is first pulled out from being stowed (e.g., the rocket is attached to the release), followed by a canopy of the parachute, followed by suspension lines of the parachute. Either suspension lines or a riser of the parachute are held in a lower parachute line restrainer. See, for example FIGS. 2A-2C.

At 402, it is determined whether to release a lower parachute line restrainer. For example, a lower parachute line restrainer may be designed to release if the lower parachute line restrainer is subjected to a force greater than a first threshold force. In the event the lower parachute line restrainer is not subjected to a force greater than the first threshold force, the parachute continues to be towed by the rocket via the tow line. For example, the rocket continues pulling upwards on the tow line. The payload continues exerting a downwards force on the tow line. See, for example, FIG. 2C.

In the event it is determined to release the lower parachute line restrainer, at 404 the lower parachute line restrainer releases, causing the one or more lower parachute lines to release to their full lengths. In some embodiments, the lower parachute line restrainer effectively shortens the lengths of the one or more lower parachute lines and they are restored to their full length following the release of the lower parachute line restrainer. See, for example FIG. 2D and FIG. 2E where the lower parachute lines are folded and tied using the lower parachute line restrainer, which reduces their effective length. The release of the lower parachute line restrainer may comprise breakage, snapping, fraying, or any other release. The change in relative lengths causes the tow line to become slack (e.g., because its effective length increases). In some embodiments, the release line eventually becomes taut (e.g., because the increase in the effective lengths of the lower parachute lines causes the load path which includes the release line to be shorter than the load path which includes the now-released lower parachute lines).

At 406, it is determined whether a load switches from a first load path which includes the tow line and the lower parachute lines to a second load path which includes a release line. For example, because the lower parachute lines are now released, that load path now has a longer effective length than the load path which includes the release line. Eventually, the load path which includes the release line will be pulled taut, switching the load onto that line. See, for example, FIG. 2E.

In the event the load switches from the first load path which includes the tow line and the lower parachute lines to the second load path which includes the release line, at 408 the release opens, permitting the rocket and the parachute to separate. In some embodiments, the release line is configured to open the release if a second threshold force is exceeded (e.g., the tow line and release line are configured to separate from the release in the event the release line experiences a force greater than the second threshold force). For example, one or both of the lines may be released from a latch or cut using a cutter. More detailed examples of the release are described below.

In some embodiments, the release remains with the rocket. The tow line and the release line separate from the release, allowing the parachute to be separated from the rocket and released. See, for example, FIG. 2F.

The following figure provides some context for the process of FIG. 4 (e.g., with respect to which line is bearing the load at various steps in FIG. 4).

Figure 5:
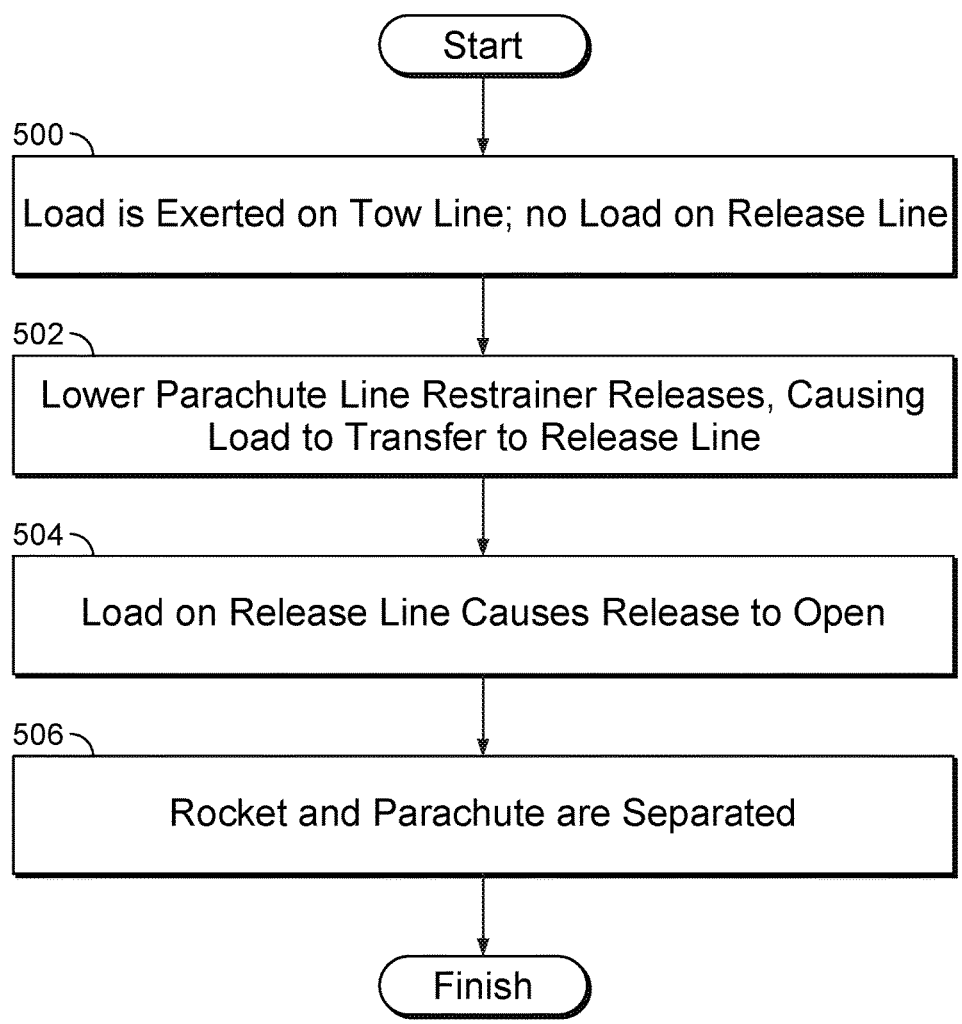
FIG. 5 is a flow diagram illustrating an embodiment of a parachute deployment system process.

FIG. 5 is a flow diagram illustrating an embodiment of a parachute deployment process with load-bearing context. In this example, context for various steps in FIG. 4 is provided, primarily with regard to which line is bearing the load at various steps. In some embodiments, both the tow line and the release line are under no load at the beginning of parachute extraction (e.g., before the rocket is ignited). Both lines are slack as the rocket begins to propel away from the payload. Two load paths are available that connect the rocket and the payload. A first load path including the tow line is (initially) shorter than a second load path including the release line (e.g., because one or more lower parachute lines are wound up and tied, effectively shortening them). As the distance between the rocket and the payload reaches the length of the first load path, line elements in the first load path become taut and are under load. The second load path is not loaded and line elements in the second path are slack. At 500, the tow line is under load and there is no load on the release line. In the context of FIG. 4, step 500 may describe step 400.

At 502, the lower parachute line restrainer releases, causing load to transfer to the release line. This step relates to steps 404 and 406 in FIG. 4. Release of the lower parachute line (see step 404 in FIG. 4) causes the first load path to be longer than the second load path by extending the (e.g., effective) length of a line element of the first load path (e.g., a riser or suspension lines). In some embodiments, both load paths are momentarily not loaded upon the extension of length of the first load path. As the distance between the rocket and the payload reaches that of the second load path, either due to the payload dropping or the rocket propelling upwards, line elements in the second load path such as the release line are pulled taut. See, e.g., step 406 in FIG. 4. In some embodiments, the second load path experiences only a small load before triggering the release to open. The full line load of the tow line may not be transferred to the release line.

At 504, the load on the release line causes the release to open. See step 408 in FIG. 4. In some embodiments, the lower parachute line restrainer is configured to release when the parachute is fully extracted. In quick succession, the release is subsequently opened which allows separation of the rocket and parachute. The tow line experiences a large load (e.g., which is good for deploying the parachute at low velocities and/or low altitudes) whereas the release line experiences a small load (e.g., which is good for little or no recoil) before quickly triggering release. Once the parachute is fully extracted, the rocket is no longer needed.

At 506, the rocket and the parachute are separated. The rocket is safely removed without causing a rebound or reactionary movement from the parachute.

As described above, a release may comprise a variety of components. The following figures describe some examples where the release includes a latch and a cutter. For clarity, the exemplary release is described at various points at time.

Figure 6A:
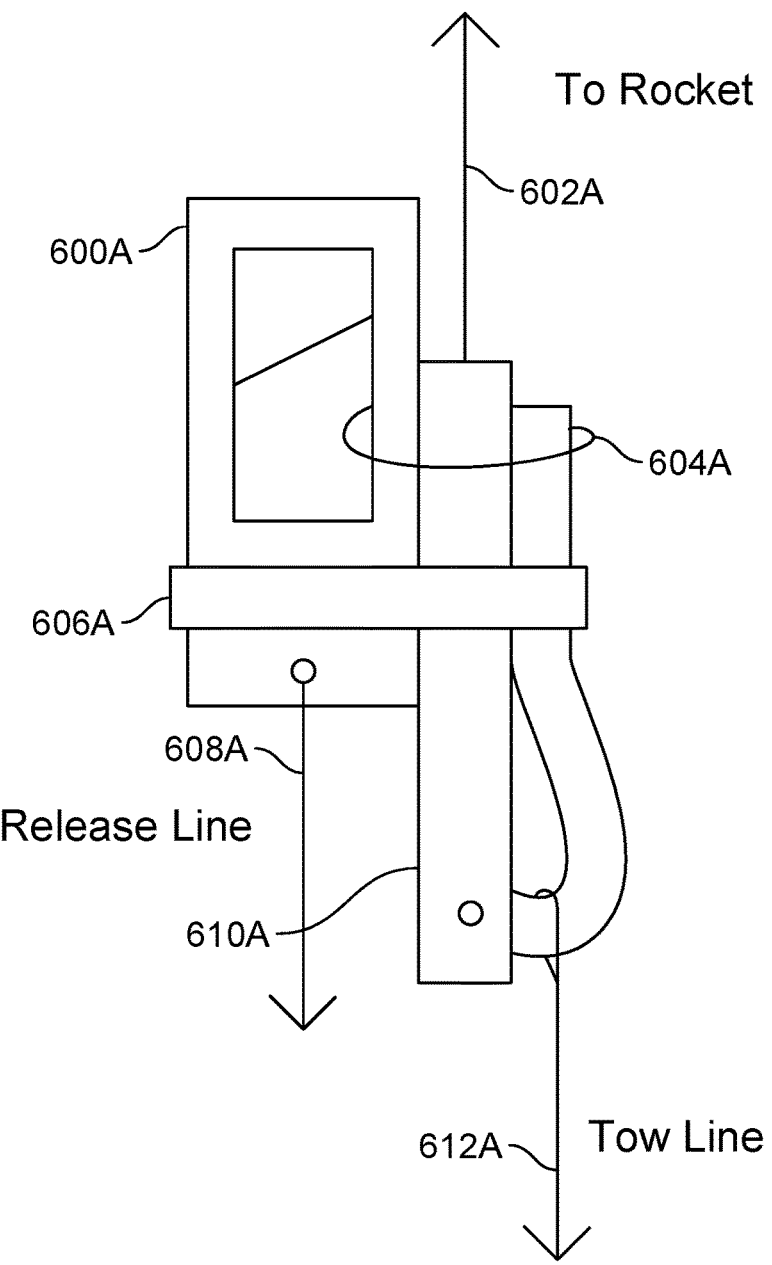
FIG. 6A is a diagram illustrating an embodiment of a release comprising a latch and a cutter.

FIG. 6A is a diagram illustrating an embodiment of a release comprising a latch and a cutter. In some embodiments, release 104 of FIG. 1 is implemented as shown here. In this example, the load on the release line causes a cutter to be pulled downwards. The cutter is pulled down on a line, binding, or wrapper that holds a latch shut, causing the latch to open. A tow line held in the latch is released.

In the example shown, cutter 600A and latch 610A are positioned adjacent to each other. Latch 610A as shown comprises a rectangular component and a curved component. Generally speaking, the latch is U-shaped with a hinge so that the curved part can swing away from the rectangular part. In this example, the curved part is shaped to provide a mechanical advantage such that the high tow line load can be reacted by a lower latch restrainer load on 604A. This allows the latch restrainer to be smaller, which makes it easier to cut (e.g., it lowers the cut and/or release load).

Latch restrainer 604A as shown holds latch 610A in a closed position (e.g., with all parts of the latch forming a continuous loop without an opening or break). For example, the latch restrainer clamps two top ends of the latch together so that the latch cannot open. Latch restrainer 604A may comprise a line or a strip of fabric. In this example, latch restrainer 604A is made of a material that is able to be cut with a blade, such as cotton or nylon.

In the example shown, latch restrainer 604A loops through cutter 600A. In some embodiments, latch restrainer 604A is exposed to a blade of the cutter through some other configuration or relative positioning of the blade and latch restrainer. For example, a blade is able to access and cut through the latch restrainer based on relative positions of the cutter and latch. In some embodiments, the latch restrainer is threaded through holes in the latch and/or cutter. For example, the latch restrainer comprises a line that is threaded through a hole at the end of the rectangular component of the latch, a hole in an end of the curved component of the latch, and through a hole in the side of the cutter.

In the example shown, release system restrainer 606A is positioned around cutter 600A and latch 610A. In various embodiments, the release system restrainer comprises a zip tie, a line, a strip of fabric, or any appropriate restrainer which tears or releases when sufficient force or load is exerted downward on release line 608A and/or upward on line 602A to the rocket. In some embodiments, the release system restrainer maintains the positions of the cutter and the latch relative to each other. For example, latch restrainer 604A does not securely hold the positioning of the cutter and the latch by itself. The release system restrainer holds the cutter in a position where the blade of the cutter is not in contact with the latch restrainer. In some embodiments, the release system restrainer is configured to break or release under a specific threshold force. In the event the specific threshold force is exerted on the release system restrainer, cutter 600A will move downward (e.g., due to tension in the release line) and cut latch restrainer 604A, causing latch 610A to open. For example, the release system restrainer breaks in the event the release line is under the second threshold force.

Tether 602A is attached to the top of the latch 610A as shown and attaches the latch to a rocket. Tow line 612A is held inside of latch 610A (e.g., tow line 612A is threaded through or around latch 610A). In some embodiments, tow line 612A implements tow line 108 of FIG. 1. As shown, the tow line has a loop at its end and the curved component of the latch is positioned in the loop. The tow line is not permanently attached to the latch. Release line 608A extends from the bottom of cutter 600A. In some embodiments, release line 608A implements release line 114 of FIG. 1.

Figure 6B:
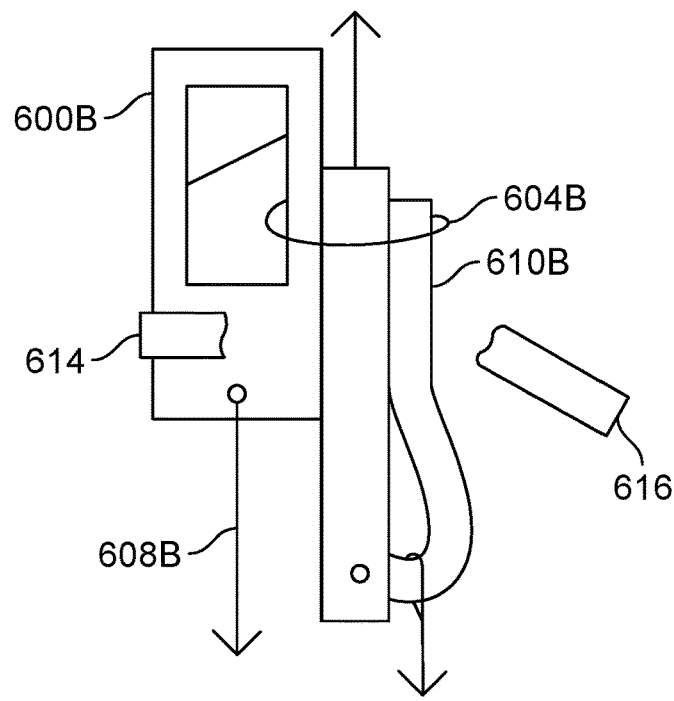
FIG. 6B is a diagram illustrating an embodiment of a release wherein a release system restrainer is broken.

FIG. 6B is a diagram illustrating an embodiment of a release wherein a release system restrainer is broken. In the event release line 608B is under load, a force is exerted on the release system restrainer. In the event the force exerted on the release system restrainer exceeds the specific threshold force of the release system restrainer, the release system restrainer breaks or releases. In the example shown, release system restrainer pieces 614 and 616 have broken off. Cutter 600B and latch 610B are shown in their positions immediately as the release system restrainer is breaking off. In the example shown, latch restrainer 604B remains intact.

Figure 6C:
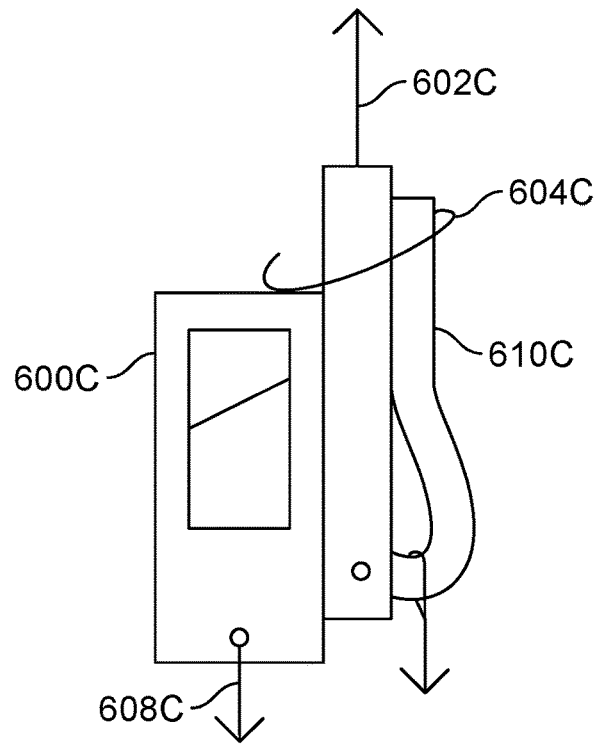
FIG. 6C is a diagram illustrating an embodiment of a release wherein a latch restrainer is broken.

FIG. 6C is a diagram illustrating an embodiment of a release wherein a latch restrainer is broken. In some embodiments, without the release system restrainer intact, the cutter falls downwards relative to the latch. For example, the cutter falls because it is being pulled by release line 608C and the latch is towed upwards by the rocket via line 602C. In the example shown, cutter 600C drops in its position relative to latch 610C, severing latch restrainer 604C. Following the severance of latch restrainer 604C, cutter 600C remains attached to the parachute via release line 608C but is no longer attached to latch 610C or the rocket. Latch 610C remains tethered to the rocket via line 602C. At the moment shown, latch 610C is in a closed position.

Figure 6D:
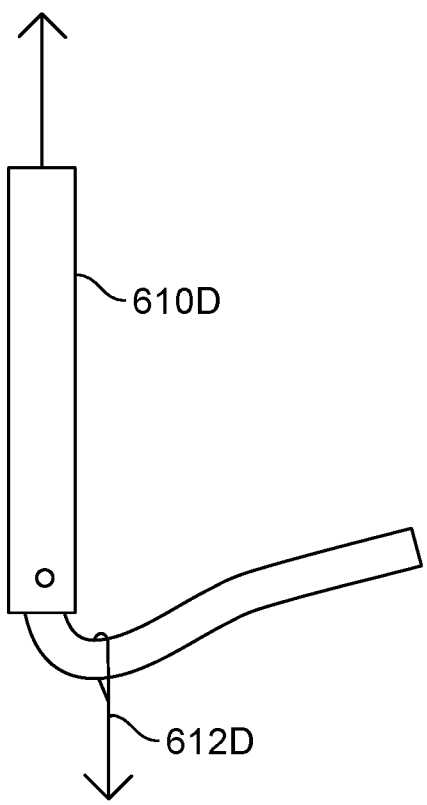
FIG. 6D is a diagram illustrating an embodiment of a release wherein a latch is open.

FIG. 6D is a diagram illustrating an embodiment of a release wherein a latch is open. After the latch restrainer is cut, the latch opens (e.g., the curved part of the latch has rotated about a hinge, causing it to separate from the rectangular part of the latch). Latch 610D is shown in an open position. Tow line 612D as shown remains on the curved component of latch 610D. As the rocket tows latch 610D up and away, tow line 612D slips off of latch 610D. In some embodiments, a small additional load on tow line 612D causes the tow line to come off of latch 610D. For example, as the rocket continues flying and the payload continues dropping, tow line 612D is pulled taut and pulled off from latch 610D. In various embodiments, the two halves of the latch may separate to various degrees (e.g., nearly 180° if desired) by adjusting or configuring the hinge as desired. In some embodiments, the two halves of the latch may separate completely after the latch opens.

Because the tow line 612D slips off of open latch 610D, there is very little recoil when the rocket separates from the parachute. In contrast, if a load path (e.g., bearing all of the load) were directly cut or otherwise severed, there would be a significant amount of recoil because of the tension or load on the line prior to the line being cut. As described above, a large amount of recoil is undesirable in some aircraft applications, which makes the techniques described herein useful.

Figure 6E:
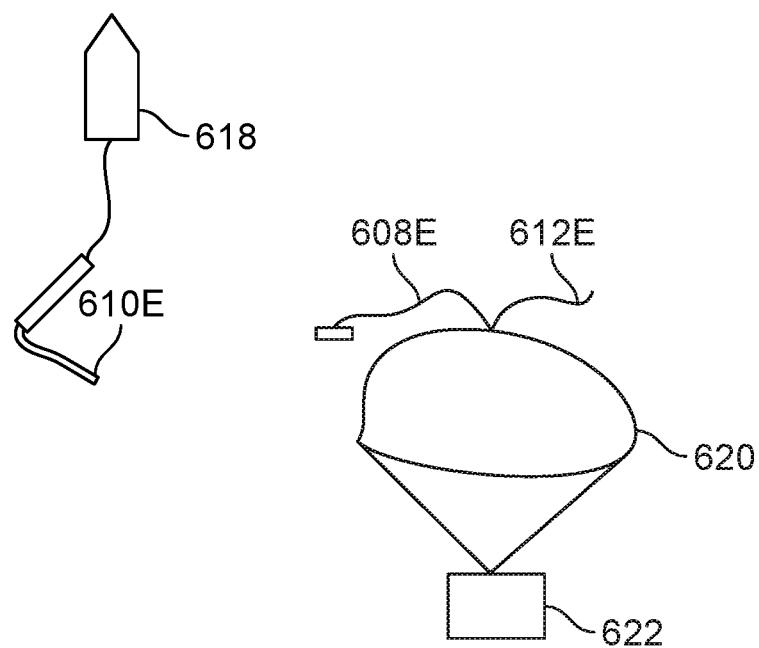
FIG. 6E is a diagram illustrating an embodiment of a parachute deployment system following separation of the parachute and a rocket.

FIG. 6E is a diagram illustrating an embodiment of a parachute deployment system following separation of the parachute and a rocket. The example shown provides an overall view of the parachute deployment system following opening of the release. In the example shown, rocket 618 is attached to latch 610E. After separating, the rocket may tow the latch for a distance and then begin to drop. In some embodiments, the rocket has its own recovery system (e.g., a parachute).

Release line 608E and attached cutter remain attached to parachute 620. Tow line 612E (and upper parachute lines and/or crown lines) also remains attached to parachute 620. As shown, parachute 620 is completely filled and is attached to payload 622.

Figure 7:
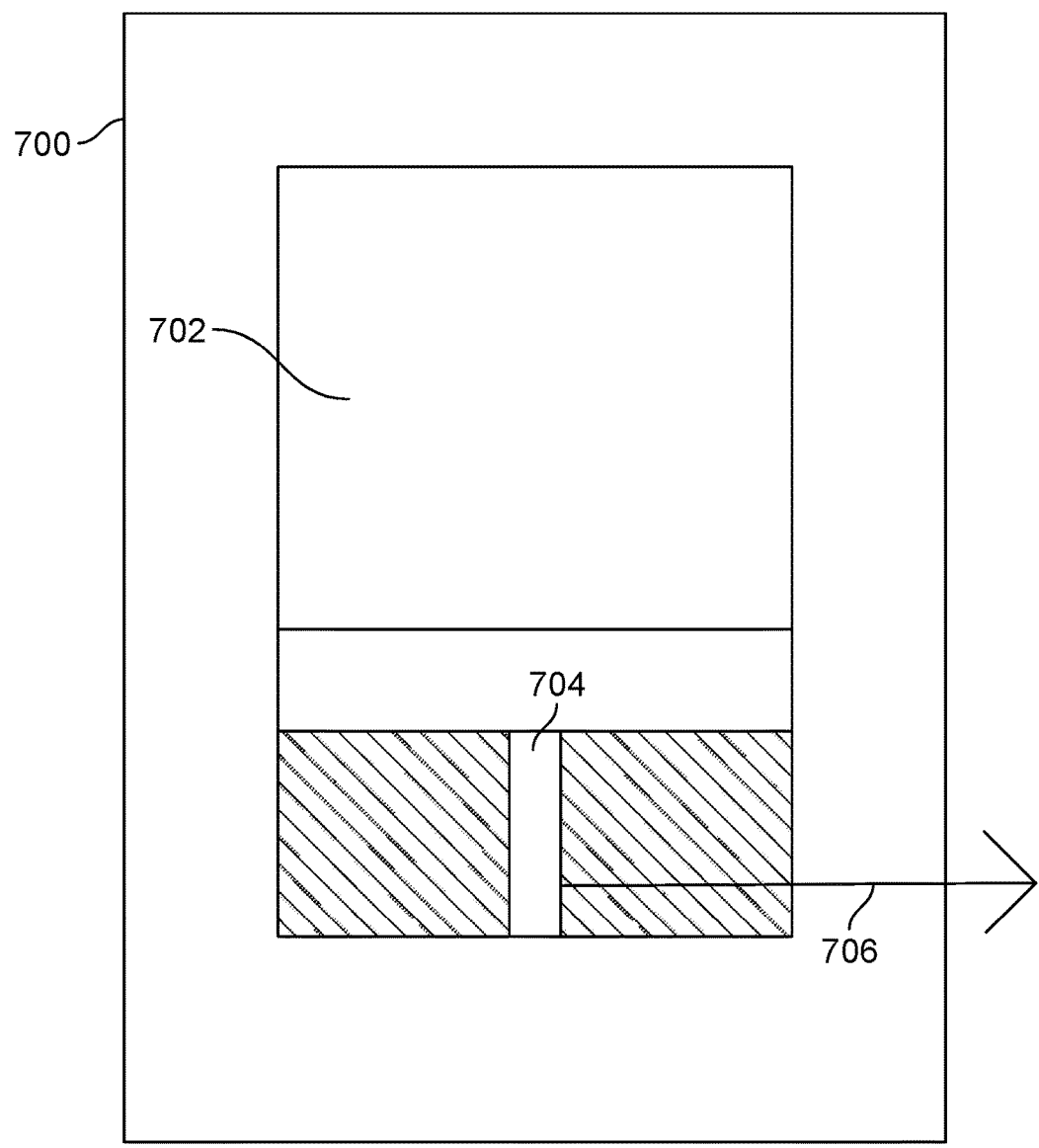
FIG. 7 is a diagram illustrating an embodiment of a cutter.

FIG. 7 is a diagram illustrating an embodiment of a cutter with a channel to thread the latch restrainer through. In various embodiments, the cutter is configured in different ways. In this example, vibrations through lines, movement of the rocket/payload, or environmental factors such as wind may cause the blade of a cutter to come into contact with the latch restrainer earlier than desired (e.g., when the release line is not under load). To address this, the exemplary cutter shown here is configured to minimize chances of accidental severance of the latch restrainer (e.g., caused by vibrations, slipping, etc.).

In the example shown, cutter 700 comprises a blade that is held in a recessed area within a frame. For example, blade 702 is secured such that it cannot rattle or move (e.g., prematurely) from its position in the cutter. Latch restrainer 706 is threaded through a small channel or window in the cutter. Channel 704 is a slim opening through the cutter that allows blade 702 to be pulled down on the latch restrainer and cut the latch restrainer. Using a secured blade and a small channel of access (e.g., through which the latch restrainer is threaded) decreases the chances of unintentional and/or premature cutting of the latch restrainer.

Figure 8:
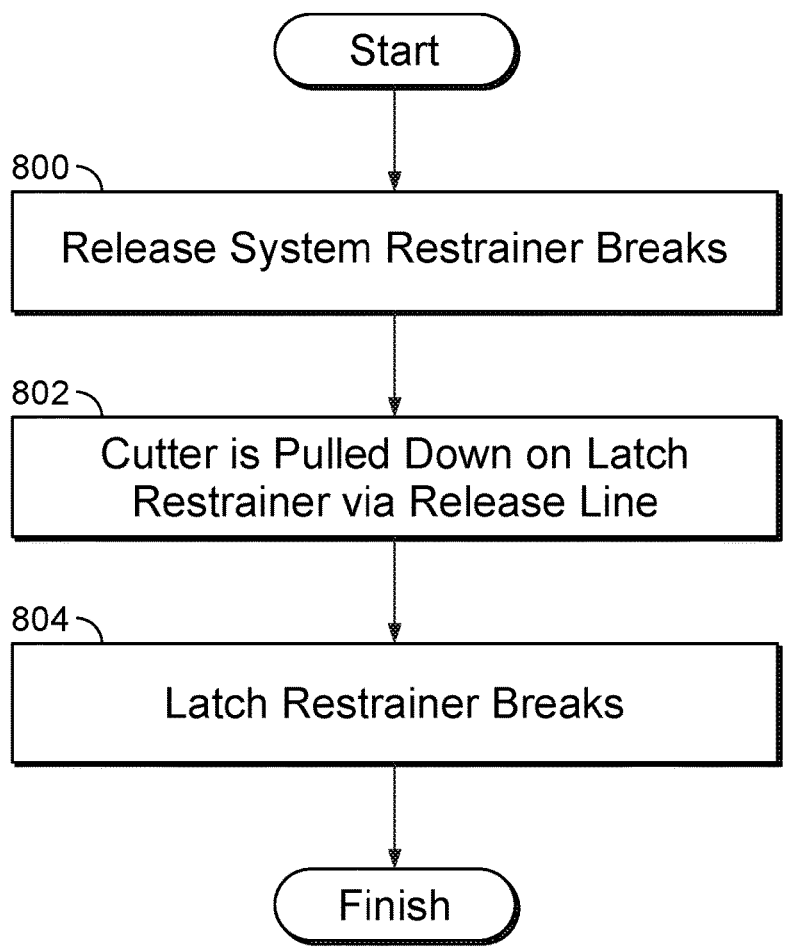
FIG. 8 is a flow diagram illustrating an embodiment of a process to open a release.

FIG. 8 is a flow diagram illustrating an embodiment of a process to open a release. In some embodiments, the process is used at step 408 in FIG. 4. At 800, the release system restrainer breaks. For example, the release system restrainer breaks after a threshold force is exerted on the release line. The release line may be under load following the release of the lower parachute line restrainer, which changes the load path from one including the tow line to one including the release line.

At 802, the cutter is pulled down on the latch restrainer via the release line. For example, the latch restrainer and cutter move relative to each other, causing the blade of the cutter to cut the latch restrainer.

At 804, the latch restrainer breaks. For example, the latch restrainer may be a line or tie that is cut. In some embodiments, the latch opens in the event the latch restrainer breaks. For example, in the previous figures, the latch has a hinge and part of the latch falls open by rotating on the hinge.

In some embodiments, the disclosed system is capable of recovering a payload at low altitude and low speed conditions and is also adaptable to high speed or high altitude conditions. The parachute deployment system tolerates high loads during initial extraction of the parachute, but actuates release of the rocket with a low load. The disclosed system may be packed into a small space and is low mass. In some embodiments, the disclosed parachute deployment system tolerates chaotic extraction and is agnostic to rotation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A parachute deployment system, comprising:
   a parachute which is coupled to a rocket via a first load path, which includes a tow line, one or more upper parachute lines, and one or more lower parachute lines, and a second load path, which includes a release line and a riser of the parachute;
   the rocket which is configured to tow the parachute via the tow line;
   a lower parachute line restrainer which when released permits the lower parachute lines to extend to full length; and
   a release, wherein:
      the release is configured to open in response to tension switching from the first load path to the second load path; and
      when the release is open, the parachute and the rocket are permitted to separate.

2. The system of claim 1, wherein the release includes one or more of the following: a latch, a cutter, or a pin.

3. The system of claim 1, wherein the lower parachute lines include one or more suspension lines of the parachute.

4. The system of claim 1, wherein the lower parachute lines include a riser of the parachute.

5. The system of claim 1, wherein the first load path includes the tow line, the upper parachute lines, at least a portion of the parachute positioned between the tow line and a suspension line of the parachute, the suspension line of the parachute, and a riser of the parachute.

6. The system of claim 1, wherein the first load path is configured to be longer in length than the second load path in the event the lower parachute line restrainer is intact and the first load path is configured to be shorter than the second load path in the event the lower parachute line restrainer is released.

7. The system of claim 1, wherein the release includes a cutter and a latch.

8. The system of claim 1, wherein:
   the release includes a cutter, a latch, and a latch restrainer;
   the release line is attached to the cutter and is configured to pull the cutter in order to cut the latch restrainer;
   the latch is configured to open when the latch restrainer is cut; and
   the tow line is configured to slide off the latch when the latch is open.

9. The system of claim 1, wherein:
   the release includes a cutter, a latch, and a latch restrainer;
   the release line is attached to the cutter and is configured to pull the cutter in order to cut the latch restrainer;
   the latch is configured to open when the latch restrainer is cut;
   the tow line is configured to slide off the latch when the latch is open; and
   the latch includes a U-shaped latch with a hinge.

10. The system of claim 1, wherein the tow line is attached to multiple lines that are attached around a canopy between an apex of the canopy and an opening of the canopy.

11. The system of claim 1, wherein:
   the tow line is attached to multiple lines that are attached around a canopy between an apex of the canopy and an opening of the canopy; and
   the canopy is packed with the apex of the canopy inverted.

* * * * *